(12) United States Patent
Choi (10) Patent No.: US 11,770,597 B2
(45) Date of Patent: Sep. 26, 2023

(54) HEATING DEVICE FOR CAMERA MODULE AND CAMERA MODULE HAVING SAME

(71) Applicant: LG INNOTEK CO., LTD., Seoul (KR)

(72) Inventor: Hyun Ho Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/456,991

(22) Filed: Nov. 30, 2021

(65) Prior Publication Data

US 2022/0086320 A1 Mar. 17, 2022

Related U.S. Application Data

(63) Continuation of application No. 16/838,811, filed on Apr. 2, 2020, now Pat. No. 11,218,621, which is a (Continued)

(30) Foreign Application Priority Data

Feb. 15, 2016 (KR) .................. 10-2016-0017256

(51) Int. Cl.
  *H04N 23/52* (2023.01)
  *H04N 23/51* (2023.01)
  (Continued)

(52) U.S. Cl.
  CPC .......... *H04N 23/52* (2023.01); *G02B 27/0006* (2013.01); *G03B 17/55* (2013.01);
  (Continued)

(58) Field of Classification Search
  CPC .............. H04N 5/2251; H04N 5/2252; H04N 5/22521; H04N 5/2254; H04N 23/51;
  (Continued)

(56) References Cited

U.S. PATENT DOCUMENTS 5,500,953 A 3/1996 Reuber et al.
10,077,639 B2 9/2018 Fleming
(Continued)

FOREIGN PATENT DOCUMENTS

CN 102135705 A 7/2011
CN 202003121 U 10/2011
(Continued)

OTHER PUBLICATIONS

International Search Report in International Application No. PCT/KR2017/000314, filed Jan. 10, 2017.
(Continued)

*Primary Examiner* — Daniel M Pasiewicz
(74) *Attorney, Agent, or Firm* — Saliwanchik, Lloyd & Eisenschenk (57) ABSTRACT

A heating device for a camera module comprises: a resistance heating film formed on a lens through which external light is introduced for generating heat by electric current; a power applying member for supplying the electric current to the resistance heating film; and a connecting member for electrically connecting the resistance heating film and the power applying member in close contact with each other.

20 Claims, 7 Drawing Sheets

Related U.S. Application Data continuation of application No. 16/077,639, filed as application No. PCT/KR2017/000314 on Jan. 10, 2017, now Pat. No. 10,645,263.

(51) Int. Cl.

| | | |
|---|---|---|
| *H04N 23/55* | (2023.01) | |
| *H04N 23/57* | (2023.01) | |
| *H05B 3/06* | (2006.01) | |
| *H05B 3/14* | (2006.01) | |
| *G02B 27/00* | (2006.01) | |
| *G03B 17/55* | (2021.01) | |
| *H05B 3/84* | (2006.01) | |

(52) U.S. Cl.
CPC ............ *H04N 23/51* (2023.01); *H04N 23/55* (2023.01); *H04N 23/57* (2023.01); *H05B 3/06* (2013.01); *H05B 3/141* (2013.01); *H05B 3/84* (2013.01); *H05B 2203/014* (2013.01); *H05B 2203/016* (2013.01)

(58) Field of Classification Search
CPC ........ H04N 23/52; H04N 23/55; H04N 23/57; G03B 17/55; G02B 27/0006; H05B 3/06; H05B 3/26; H05B 3/84; H05B 3/141
See application file for complete search history.

(56) References Cited

U.S. PATENT DOCUMENTS

| | | | |
|---|---|---|---|
| 10,645,263 B2 | 5/2020 | Choi | |
| 11,218,621 B2 * | 1/2022 | Choi | .................. G02B 27/0006 |
| 2003/0214733 A1 | 11/2003 | Fujikawa et al. | |
| 2004/0223074 A1 | 11/2004 | Takada | |
| 2006/0171704 A1 | 8/2006 | Bingle et al. | |
| 2010/0165134 A1 | 7/2010 | Dowski, Jr. et al. | |
| 2010/0265048 A1 | 10/2010 | Lu et al. | |
| 2012/0117745 A1 | 5/2012 | Hattori et al. | |
| 2012/0170119 A1 | 7/2012 | Chu et al. | |
| 2012/0243093 A1 | 9/2012 | Tonar et al. | |
| 2014/0160581 A1 | 6/2014 | Cho et al. | |
| 2015/0153539 A1 | 6/2015 | Yoo et al. | |
| 2017/0099700 A1 | 4/2017 | Chae et al. | |
| 2018/0176431 A1 | 6/2018 | Kim et al. | |
| 2018/0239105 A1 | 8/2018 | Lee et al. | |
| 2019/0041630 A1 | 2/2019 | Park | |
| 2019/0212549 A1 | 7/2019 | Choi et al. | |
| 2019/0278046 A1 | 9/2019 | Yamamoto | |

FOREIGN PATENT DOCUMENTS

| | | |
|---|---|---|
| EP | 2 014 972 A1 | 1/2009 |
| JE | 2010-276826 A | 12/2010 |
| JP | 2004-085618 A | 3/2004 |
| JP | 2004-93841 A | 3/2004 |
| JP | 2008-116803 A | 5/2008 |
| JP | 2012-063723 A | 3/2012 |
| JP | 2013-242833 A | 12/2013 |
| JP | 2014-17219 A | 1/2014 |
| KR | 20-0342920 Y1 | 2/2004 |
| KR | 10-2008-0006816 A | 1/2008 |
| KR | 10-2008-0051449 A | 6/2008 |
| KR | 10-2010-0019676 A | 2/2010 |
| KR | 10-2011-0068442 A | 6/2011 |
| KR | 10-1419542 B1 | 7/2014 |
| KR | 10-2015-0080730 A | 7/2015 |
| WO | 2010/055753 A1 | 5/2010 |

OTHER PUBLICATIONS

Office Action dated Sep. 24, 2019 in U.S. Appl. No. 16/077,639.
Notice of Allowance dated Jan. 2, 2020 in U.S. Appl. No. 16/077,639.
Office Action dated Jul. 2, 2020 in Chinese Application No. 201780011815.1.
Office Action dated Mar. 17, 2021 in U.S. Appl. No. 16/838,811.
Notice of Allowance dated Aug. 30, 2021 in U.S. Appl. No. 16/838,811.
Office Action dated Jan. 29, 2022 in Korean Application No. 10-2016-0017256.
Office Action dated Jul. 17, 2022 in Korean Application No. 10-2016-0017256.
Office Action dated Jun. 14, 2023 in Chinese Application No. 202110388270.4.

* cited by examiner

HEATING DEVICE FOR CAMERA MODULE AND CAMERA MODULE HAVING SAME

CROSS-REFERENCE TO RELATED APPLICATIONS

This application is a continuation of U.S. application Ser. No. 16/838,811, filed Apr. 2, 2020; which is a continuation of U.S. application Ser. No. 16/077,639, filed Aug. 13, 2018, now U.S. Pat. No. 10,645,263, issued May 5, 2020; which is the U.S. national stage application of International Patent Application No. PCT/KR2017/000314, filed Jan. 10, 2017, which claims the benefit under 35 U.S.C. § 119 of Korean Application No. 10-2016-0017256, filed Feb. 15, 2016, the disclosures of each of which are incorporated herein by reference in their entirety.

TECHNICAL FIELD

The teachings in accordance with exemplary and non-limiting embodiments of this invention relate generally to a heating device for camera module and a camera module having the same.

BACKGROUND ART

Recently, small camera modules are widely used in various industrial fields. Particularly, the small camera modules are widely used in IT industries such as smart phones, tablet PCs, gamers, CCTVs, and automobile industries. The camera modules widely used in various industries may largely include a lens incident on by an outside light, an image sensor module converting the light incident from the lens to a digital image or a video, and a housing accommodating the lens and an image sensor.

The lens of camera module may generally have a structure exposed to outside in order to receive the outside light.

When the lens of camera module is exposed to outside, an outside and an inside of lens may be wetted by moisture or may generate frostiness during wintertime. When the lens of a camera module is wetted or is generated with frostiness, a light having passed the lens may be incident on an image sensor by being distorted due to moisture or frostiness to greatly decrease the quality of image of video. In order to inhibit this phenomenon, a technique to inhibit formation of moisture or frostiness on a lens must be developed.

The conventional art to inhibit the generation of moisture or frostiness on a lens may include the Korean Laid-open patent No.: 10-2010-0019676 (Feb. 19, 2010) entitled a "vehicular camera". The vehicular camera has a structure including a transparent conductor arranged in a thin film type on an outermost lens surface and a control wiring electrically connected to the transparent conductor. However, the transparent conductor for vehicular camera suffers from disadvantages in that the transparent conductor is formed on a surface contacting an outside air, and as a result, a heating efficiency is greatly reduced due to the outside air, and the transparent conductor is easily damaged by contact with outside objects such as cleaning tools and car washing to be resultantly weak to durability.

Furthermore, the coupling relationship between the transparent conductor and the control wiring is important in the vehicular camera, which is because a camera mounted on a vehicle is applied with a repetitive vibration and shock whereby the transparent conductor and the control wiring can be easily separated.

However, the abovementioned vehicular camera according to the Korean Laid-open patent No.: 10-2010-0019676 (Feb. 19, 2010) simply discloses a teaching that the transparent conductor and the control wire are electrically connected but fails to disclose in detail that the transparent conductor and control wiring of heterogeneous materials and of difficulty in electric connection are electrically connected.

In sum, the vehicular camera suffers from disadvantages in that the transparent conductor is contacted to an outside air, and the transparent conductor and the control wiring are very weak in electric connection to thereby provide a low durability and reliability of product.

DETAILED DESCRIPTION OF THE INVENTION

Technical Subject

The present invention provides a heating device for camera module greatly enhanced in durability and reliability by improving an electric coupling structure between lens heating elements through removal of moisture and frost, and a camera module having the same.

Technical Solution

In one general aspect of the present invention, there is provided a heating device for a camera module comprising: a resistance heating film formed on a lens through which external light is introduced for generating heat by electric current;
a power applying member for supplying the electric current to the resistance heating film; and
a connecting member for electrically connecting the resistance heating film and the power applying member in close contact with each other.

Preferably, but not necessarily, the resistance heating film may include an ITO (Indium Tin Oxide) film formed in the shape of a film on an inner surface facing an outside surface contacting an outside air of a lens.

Preferably, but not necessarily, the power applying member may include wirings, and a flexible PCB (Printed Circuit Board) including flexible insulation members wrapping the wirings and formed with an opening at an area contacting the resistance heating film.

Preferably, but not necessarily, the wirings exposed by the opening may be formed with a terminal part electrically contacting the resistance heating film.

Preferably, but not necessarily, the connecting member may include a conductive double-sided adhesive tape interposed between the resistance heating film and the power applying member.

Preferably, but not necessarily, the connecting member may include a sheet member disposed at a bottom surface facing an upper surface of the power applying member facing the resistance heating film, and having an elasticity closely connecting the power applying member to the resistance heating film.

Preferably, but not necessarily, the connecting member may include an elastic member disposed at a bottom surface facing an upper surface of the power applying member facing the resistance heating film, and closely connecting the power applying member to the resistance heating film.

Preferably, but not necessarily, the elastic member may include a spring including any one of a leaf spring and a coil spring.

In another general aspect of the present invention, there is provided a camera module, comprising:
a lens barrel including a lens;
a lens holder supporting the lens;
a PCB coupled with the lens barrel;
an image sensor coupled with the PCB;
a heating apparatus including a resistance heating film formed on the lens and generating a heat by a current, a power applying member disposed at the lens holder to provide the current to the resistance heating film and a connecting member electrically connecting the resistance heating film and the power applying member by closely connecting the resistance heating film and the power applying member; and
a housing coupled to the lens barrel.

Preferably, but not necessarily, the resistance heating film may include an ITO film.

Preferably, but not necessarily, the connecting member may include a conductive double-sided tape interposed between the resistance heating film and the power applying member.

Preferably, but not necessarily, the connecting member may include a sheet member disposed at the lens barrel and having an elasticity closely connecting the power applying member to the resistance heating film.

Preferably, but not necessarily, the connecting member may include an elastic member partially disposed at an inside of a groove formed at an upper surface of lens barrel to closely connecting the power applying member to the resistance heating film.

Advantageous Effects

The camera module and manufacturing method thereof according to the present invention have an advantageous effect in that durability and reliability are greatly enhanced by improving an electric coupling structure between lens heating elements through removal of moisture and frost.

BEST MODE

The invention described hereunder may be applied with various changes and several exemplary embodiments, and particular exemplary embodiments will be described in detail through exemplary drawings and detailed descriptions.

However, it should be noted that the present invention is not limited to particular exemplary embodiments, and it will be appreciated that the present invention described is intended to embrace all such alterations, modifications, and variations that fall within the scope and novel idea of the present invention. In describing the present invention, detailed descriptions of well-known art in the art may be omitted to avoid obscuring appreciation of the invention with unnecessary details.

The terminology used herein is for the purpose of describing particular exemplary embodiments only and is not intended to be limiting. As used herein, the singular forms may be intended to include the plural forms as well, unless the context clearly indicates otherwise.

The terms "including" or "comprising" are inclusive and therefore specify the presence of stated features, integers, steps, operations, elements, and/or components, but do not preclude the presence or addition of one or more other features, integers, steps, operations, elements, components, and/or groups thereof.

Although the terms, first, second, etc., may be used herein to distinguish various elements, these elements should not be limited by these terms. These terms may be used only to distinguish one element from another element.

Figure 1:
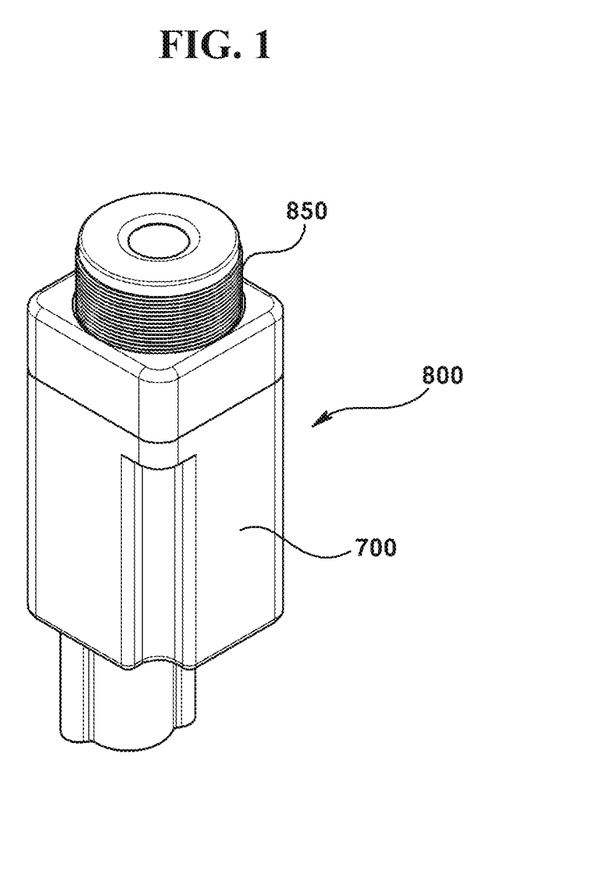
FIG. 1 is an external perspective view illustrating a camera module according to an exemplary embodiment of present invention.
Figure 2:
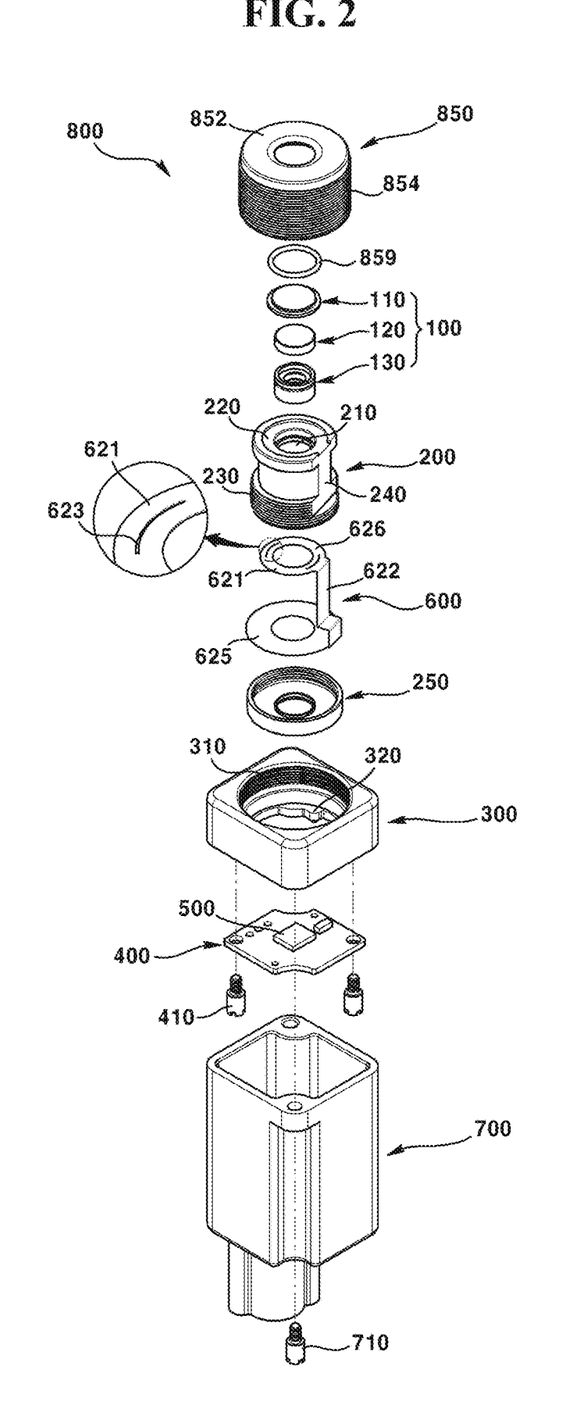
FIG. 2 is an exploded perspective view of FIG. 2.
Figure 3:
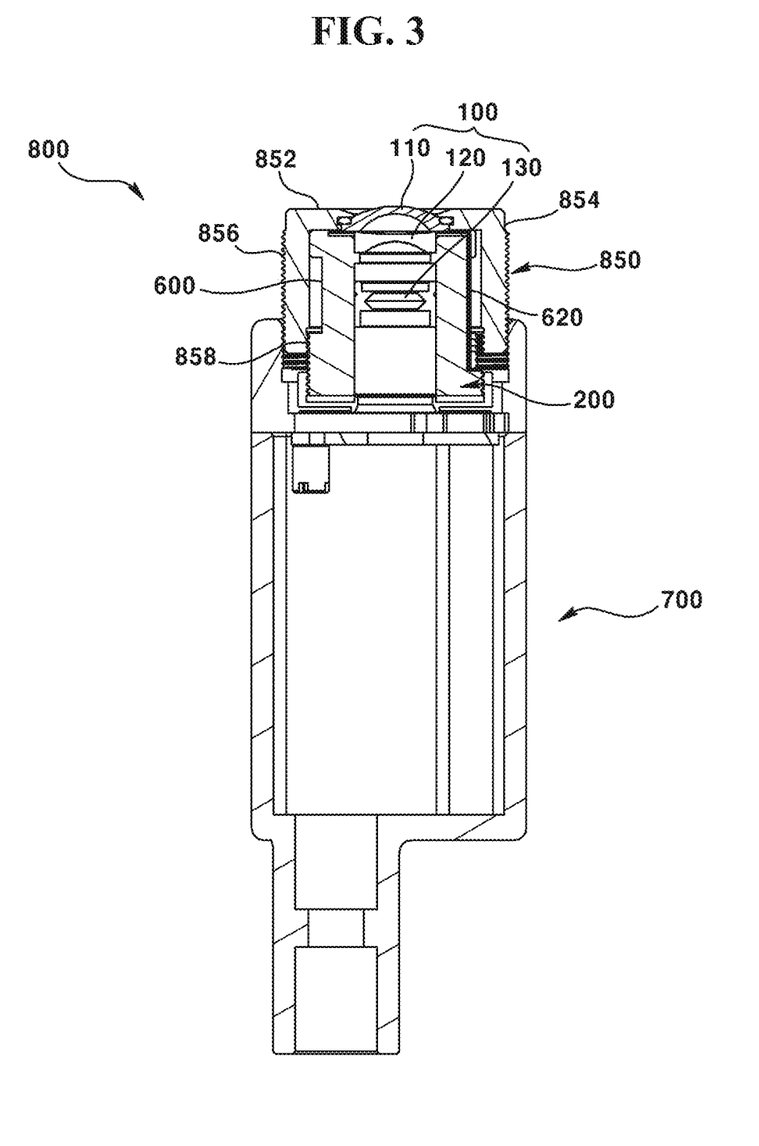
FIG. 3 is a longitudinal cross-sectional view of FIG. 1.

FIG. 1 is an external perspective view illustrating a camera module according to an exemplary embodiment of present invention, FIG. 2 is an exploded perspective view of FIG. 2, and FIG. 3 is a longitudinal cross-sectional view of FIG. 1.

Referring to FIGS. 1, 2 and 3, a camera module (800) may include a lens barrel (200) including a lens (100), a lens holder (300), a PCB (Printed Circuit Board, 400), an image sensor (500), a heating device (600) and a housing (700). The camera module (800) may further include a lens barrel cover (850).

The lens barrel (200) may be formed in cylindrical shape formed with a hollow hole (210). The lens barrel (200) may be formed at an upper surface with a reception groove (220) formed in a round shape about the hollow hole (210). The lens barrel (200) may be formed at a bottom end of outside surface with a male screw part (230).

The lens barrel (200) may be formed at a portion of the outside surface with a flatly cut-off flat part (240), and the flat part (240) may function to contact the power applying member of heating device (600, described later) to accommodate a portion of the power applying member.

The lens barrel (200) may be accommodated with lenses (100). The lens (100) according to an exemplary embodiment of the present invention may include a first lens (110) contacting an outside air, a second lens (120) and a third lens (130).

The first lens (110) may be disposed at an upper surface of lens barrel (200). The first lens (110) may be disposed at a bottom surface with the second lens (120) and the second lens (120) may be disposed at a bottom surface with the third lens (130).

Although the exemplary embodiment of the present invention has illustrated and explained that the first to third lenses (110, 120, 130) are coupled to the lens barrel (200), the lens barrel (200) may be disposed with fewer than three lenses, or more than three lenses.

The lens holder cover (850) may be formed with a space accommodating the lens barrel (200). The lens holder cover (850) may include an upper surface (852) formed with a through hole exposing the first lens (110) and a lateral surface (854).

A surrounding of the through hole at an upper surface (852) of lens holder cover (850) may be formed with a sealing ring (859) contacting the first lens (110).

An outside of lateral surface (854) of lens holder cover (850) may be formed with a male screw part (856), and a female screw part (858) may be formed on the inner surface of lateral surface (854) as illustrated in FIG. 3.

The female screw part (858) of lens holder cover (850) may be screw-connected to the male screw part (230) formed at an outside of lens holder (200), and the male screw part (856) of lens holder cover (850) may be coupled to the female screw part (310) formed at the lens holder (300).

As a result, the lens barrel (200), the lens holder (300) and the lens holder cover (850) may be assembled by mutual screw-connecting coupling method.

Unexplained reference numeral 250 is a support member screw-connected with the male screw part (230) of lens barrel (200).

The lens holder (300) may provide a reception space accommodating the lens barrel (200), and the lens holder (300) may be coupled by a housing (700) and a coupling screw (710).

An inner surface formed by the through hole passing through the lens holder (300) may be formed with a female screw part (310), and the inner surface formed by the through hole may be formed with a hitching sill (320) for supporting a PCB (described later).

The PCB (400) may be mounted with an image sensor (500), and the PCB (400) may be fastened by a fastening screw (410) to a bottom surface of lens holder (300).

The image sensor (500) may be mounted on the PCB (400), and the image sensor (500) may generate a digital image or a video using an outside light having passed the first to third lenses (110, 120, 130).

The lens holder cover (850), the lens barrel (200) and the PCB (400) may be tightly and securely assembled because the lens holder cover (850) is coupled to the lens barrel (200), the lens holder cover (850) is coupled to the lens holder (300) and the lens holder (300) is fixed by the PCB (400) mounted with the image sensor (500) according to an exemplary embodiment of the present invention.

The housing (700) may be formed therein with a reception space, and the housing (700) may be coupled to the lens holder (300) by the fastening screw (710).

The heating device (600) may serve to inhibit the first lens (110) from being wetted with moisture or from being generated with a frostiness by providing a heat to the first lens (110).

Hereinafter, various exemplary embodiments of a heating device according to an exemplary embodiment of the present invention will be described with reference to the accompanying drawings.

Figure 4:
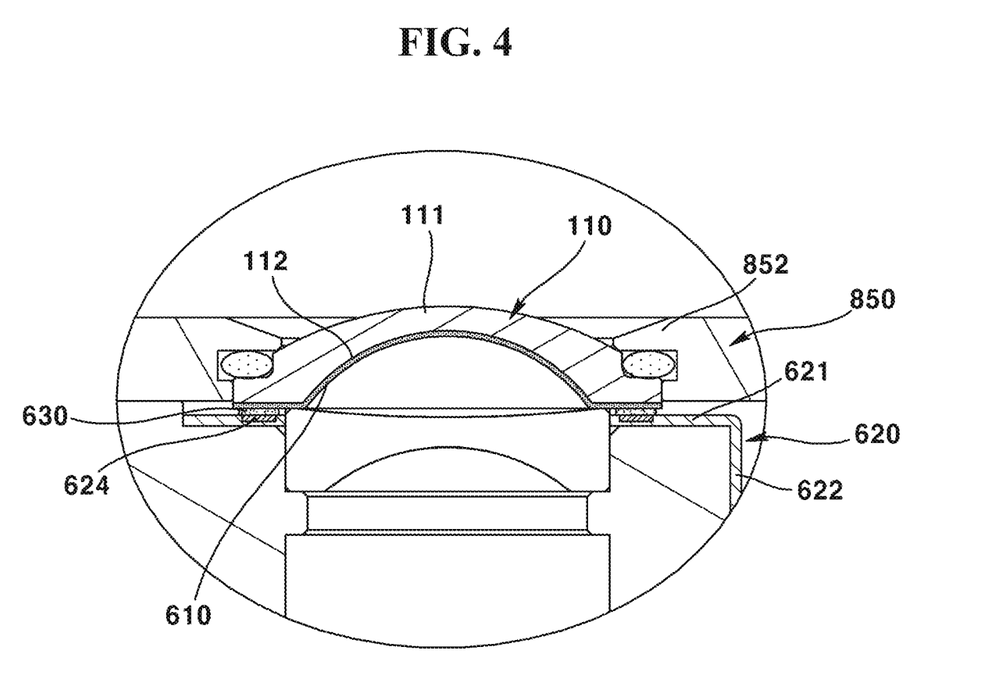
FIG. 4 is an enlarged view of a heating device according to an exemplary embodiment of present invention.

FIG. 4 is an enlarged view of a heating device according to an exemplary embodiment of present invention.

Referring to FIG. 4, a heating device (600) may include a resistance heating film (610), a power applying member (620) and a connecting member (630).

The resistance heating film (610) may be formed on an inner surface (112) facing an outside surface (111) of first lens (110) contacting an outside air.

The formation of resistance heating film (610) on the inner surface (112) of first lens (110) may inhibit the resistance heating film (610) from being damaged caused by damage from contact with outside objects and cleaning, and may inhibit the resistance heating film (610) from being lost of heat by outside air.

The resistance heating film (610) in the exemplary embodiment of present invention may be formed in a film type including an ITO material that has a light transmittance of over 90% and that can be converted to heat energy by consuming an electric energy, for example.

The resistance heating film (610) may be formed by coating process or deposition process of ITO material, for example. The power applying member (620) may function to apply a current to the resistance heating film (610).

The power applying member (620) in the exemplary embodiment of the present invention may include a first power applying part (621), a second power applying part (625) and a connecting part (622), as illustrated in FIG. 1.

The first power applying part (621) may be disposed at an inside of a reception groove (220) of lens barrel (200), and the first power applying part (621) may take a circular strip shape when viewed from a plane, and the first power applying part (621) may be disposed opposite to the resistance heating film (610) formed on the first lens (110).

The second power applying part (625) may be electrically connected to the PCB (400) by various methods, and the second power applying part (625) may take a circular strip shape when viewed from a plane, and the second power applying part (625) may be disposed opposite to the PCB (400).

The connecting part (622) may mutually connect the first and second power applying parts (621, 625), and the connecting part (622) may be supported by being in contact with the flat part (240) of lens barrel (200).

The first power applying part (621), the connecting part (622) and the second power applying part (625) may include wires (not shown) and a flexible insulation member (626) wrapping the wires. Each of the first power applying part (621), the connecting part (622) and the second power applying part (625) according to the exemplary embodiment of the present invention may include a flexible PCB (FPCB).

The wires may be disposed in a line shape along the first power applying part (621), the connecting part (622) and the second power applying part (625).

The flexible insulation member (626) may be formed with openings (623) to allow the resistance heating film (610) and the wires to be electrically connected, and the PCB (400) and the wires to be electrically connected, as illustrated in FIG. 2.

The openings (623) formed on the first power applying part (621) may be symmetrically formed about a center of the first lens (623), for example.

The first power applying part (621) exposed by the opening (623) may be formed with a terminal part (624) to allow the wires and the resistance heating film (610) to be mutually and electrically connected.

The connecting member (630) may be formed at an area corresponding to that of the terminal part (624), and the connecting member (630) may function to mutually and electrically connect the terminal part (624) and the resistance heating film (610).

The connecting member (630) according to the exemplary embodiment of present invention may include a conductive double-sided adhesive tape having adhesiveness, electric conduction and elasticity, for example.

The terminal part (624) and the resistance heating film (610) may be electrically connected and mechanically coupled by the connecting member (630) including the conductive double-sided adhesive tape, whereby the resistance heating film (610) and the power applying member (620) may be inhibited from being arbitrarily separated by shocks or vibrations applied from outside.

Figure 5:
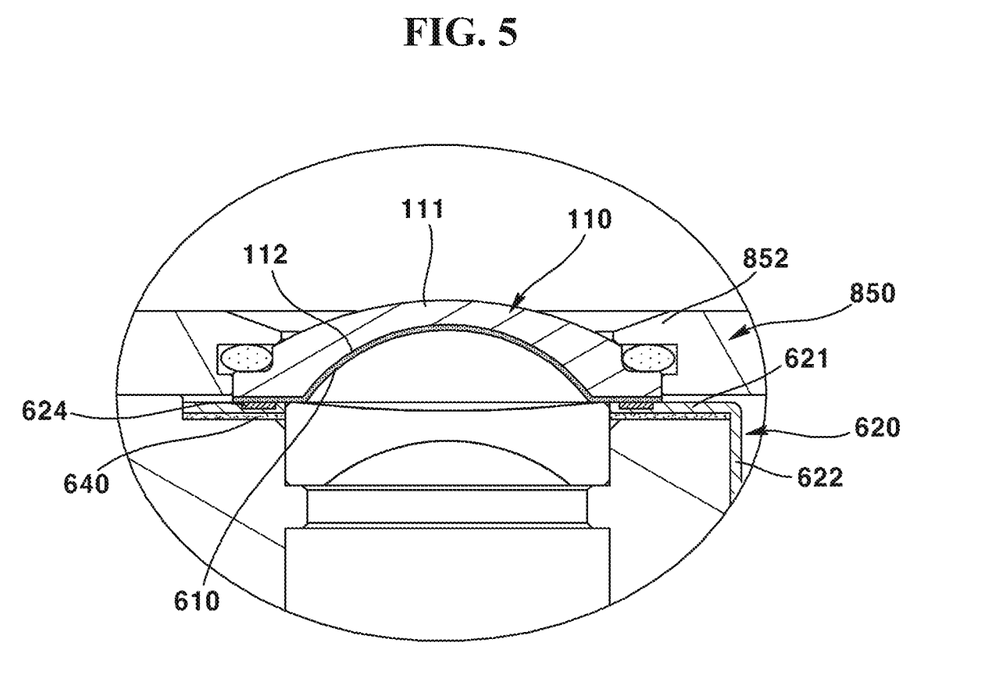
FIG. 5 is an enlarged view illustrating a heating device according to another exemplary embodiment of present invention.

FIG. 5 is an enlarged view illustrating a heating device according to another exemplary embodiment of present invention. The heating device illustrated in FIG. 5 is substantially same as the heating device explained through FIG. 4 except for a connecting member. Thus, a redundant repeated explanation will be omitted and same reference numerals and names as those in FIG. 4 will be designated with the same reference numerals and names.

Referring to FIG. 5, the heating device (600) may include a resistance heat film (610), a power applying member (620) and a connecting member (640).

The resistance heat film (610) and the terminal part (624) of power applying member (620) may be mutually contacted, and the terminal part (624) and the resistance heat film (610) may be electrically connected.

When the resistance heat film (610) and the terminal part (624) are directly contacted without using a separate conductive double-sided tape, a defective contact between the resistance heat film (610) and the power applying member (620) may be generated due to vibrations or shocks applied from outside.

In order to inhibit the defective contact, a connecting member (640) may be disposed between a reception groove (220) of lens barrel (200) and the first power applying part (621) of power applying member (620) according to an exemplary embodiment of present invention.

The connecting member (640) in the exemplary embodiment of present invention may closely adhere the first power applying part (621) to the resistance heat film (610) to allow the resistance heat film (610) and the first power applying part (621) to be contacted at all times. In order to embody this structure, the connecting member (640) may include a sheet member having elasticity.

Figure 6:
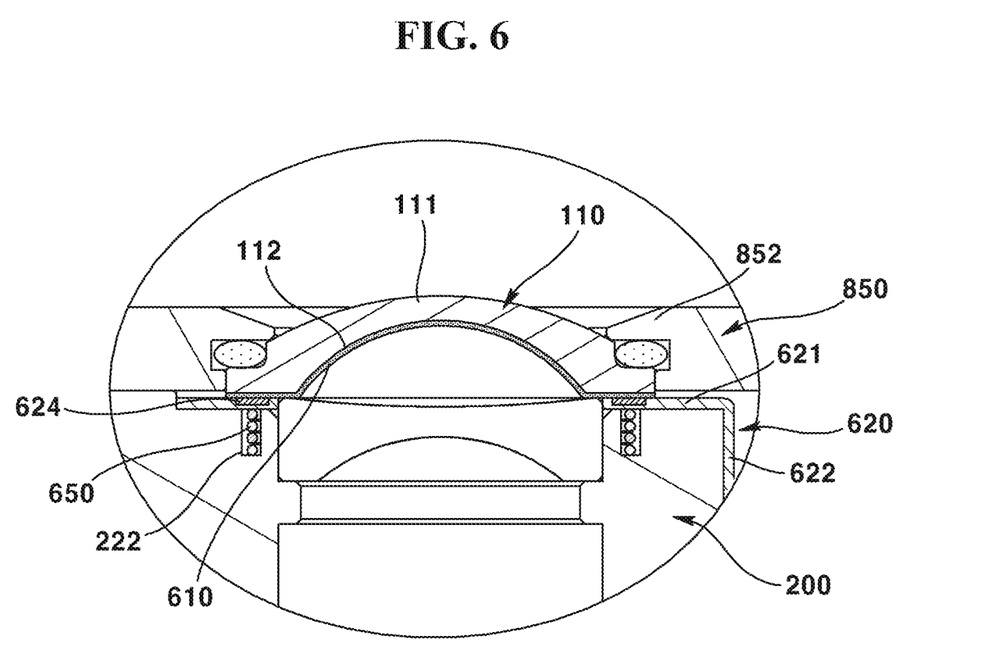
FIG. 6 is an enlarged view illustrating a heating device according to another exemplary embodiment of present invention.

FIG. 6 is an enlarged view illustrating a heating device according to another exemplary embodiment of present invention. The heating device illustrated in FIG. 6 is substantially same as the heating device explained through FIG. 5 except for a connecting member. Thus, a redundant repeated explanation will be omitted and same reference numerals and names as those in FIG. 5 will be designated with the same reference numerals and names.

Referring to FIG. 6, the heating device (600) may include a resistance heating film (610), a power applying member (620) and a connecting member (650).

The resistance heating film (610) and a terminal part (624) of power applying member (620) may be mutually and directly contacted, where the terminal part (624) and the resistance heating film (610) may be electrically connected.

When the resistance heating film (610) and the terminal part (624) are directly contacted without using a separate double-sided adhesive tape or a sheet member having elasticity, a defective contact between the resistance heating film (610) and the power applying member (620) may be generated due to vibrations and shocks applied from outside.

Furthermore, even if a sheet member having elasticity is used, and when the sheet member having a thinner thickness than a designated thickness is processed, a defective contact between the terminal part (624) of the power applying member (620) and the resistance heating film (610) may be generated.

In order to inhibit the defective contact thus mentioned, another connecting member (650) may be arranged between a reception groove (220) of lens barrel (200) and a first power applying part (621) of power applying member (620) according to an exemplary embodiment of the present invention.

The connecting member (650) may be so arranged as to allow the resistance heating film (610) and the first power applying part (621) to be always in contacted by elastically and tightly adhering the first power applying part (621) to the resistance heating film (610) according to an exemplary embodiment of the present invention.

In order to embody this arrangement, the connecting member (650) may include a spring such as a leaf spring or a coil spring.

When the connecting member (650) includes a spring like a leaf spring or a coil spring, a groove (222) for fixing a distal end of spring may be formed at the reception groove (220) of lens barrel (200) in order to inhibit the spring from being changed in position thereof.

When the distal end of spring is accommodated into the groove (222), the other distal end of spring may be protruded from the groove (222), and the other distal end of spring may be pressed by the first power applying part (621) to allow the first power applying part (621) of power applying member (620) may be elastically connected to the resistance heat film (610).

Figure 7:
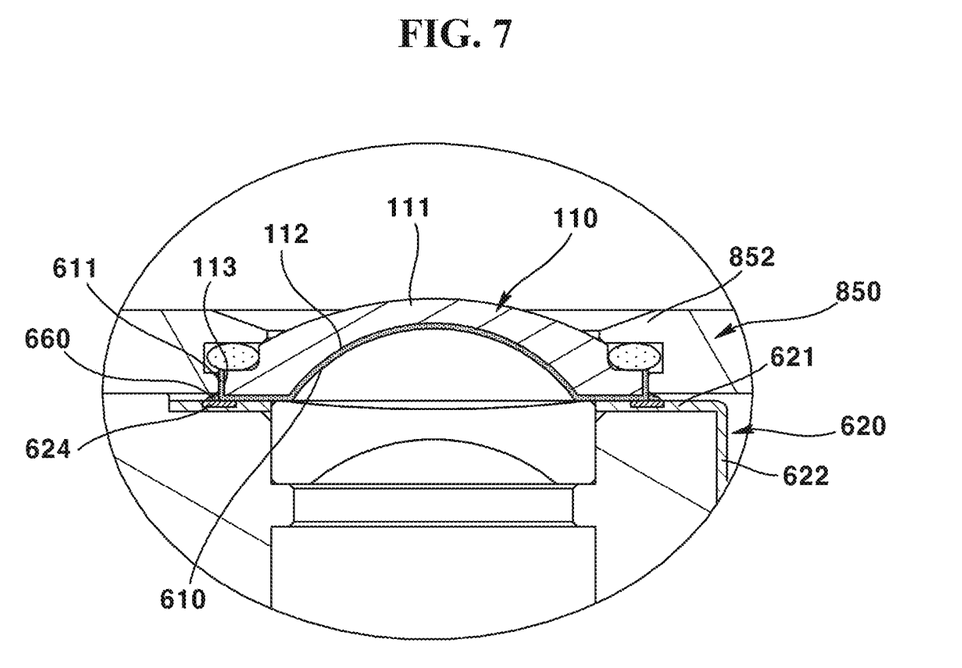
FIG. 7 is an enlarged view illustrating a heating device according to another exemplary embodiment of present invention.

FIG. 7 is an enlarged view illustrating a heating device according to another exemplary embodiment of present invention. The heating device illustrated in FIG. 7 is substantially same as the heating device explained through FIG. 5 except for a connecting member and a resistance heating film. Thus, a redundant repeated explanation will be omitted and same reference numerals and names as those in FIG. 5 will be designated with the same reference numerals and names.

Referring to FIG. 7, a heating device (600) may include a resistance heating film (610), a power applying member (620) and a connecting member (660).

The resistance heating film (610) in the exemplary embodiment of present invention may be extended from an inner surface (112) of first lens (110) toward a lateral surface (113) of the first lens (110).

Meantime, a terminal part (624) of power applying member (620) may be adjacently disposed with an area extended toward the lateral surface (113) of first lens (110) of the resistance heating film (610), and the resistance heating film (610) and the terminal part (624) may be mutually and electrically connected by a connecting member (660).

The connecting member (660) in the exemplary embodiment of the present invention may include a metal paste including conductive particles and having elasticity, and conductive particles included in the connecting member (660) may be silver particles, for example.

When the connecting member (660) and the terminal part (624) of the power applying member (620) are mutually and electrically connected using a metal paste having an elasticity in the present invention, the terminal part (624) and the resistance heating film (610) may be inhibited from being mutually and electrically separated by vibrations or shocks applied from outside.

Although the exemplary embodiment of present invention has illustrated and explained through FIGS. 4 to 7 that each connecting member (630, 640, 650, 660) individually uses the conductive double-sided tape, a sheet member having elasticity, a spring and a metal paste, alternatively, at least two connecting members in the connecting members (630, 640, 650, 660) illustrated in FIGS. 4 to 7 may be complexly applied to one camera module.

According to the foregoing explanation, the heating device for camera module and the camera module having the same can greatly enhance durability and reliability by improving an electric coupling structure between lens heating elements in order to remove moisture and frost.

Meantime, the exemplary embodiments disclosed by the enclosed drawings are merely particular examples in order to help understand the present invention, and may not be considered as limiting the scope of the present invention. It should be apparent to the skilled in the art that other modifications based on the technical ideas of the present invention are implementable.

INDUSTRIAL APPLICABILITY

The present invention may be used for a camera module mounted on a vehicle.

The invention claimed is:

1. A heating device for a camera module, comprising;
a resistance heating film disposed on a first lens;
a connecting member disposed on the resistance heating film; and
a power applying member disposed on the connecting member,
wherein the connecting member is disposed on a first portion of the resistance heating film, the first portion of the resistance heating film being disposed on a peripheral part of the first lens,
wherein the connecting member comprises a sheet member disposed at a bottom surface facing an upper surface of the power applying member facing the resistance heating film and having an elasticity closely connecting the power applying member to the resistance heating film,
wherein the power applying member comprises a terminal part in physical contact with the connecting member,
wherein the power applying member comprises a first power applying part disposed on the connecting member and comprising an upper surface facing the connecting member, a second power applying part spaced apart from the first power applying part in an optical axis direction and comprising an upper surface that is parallel to the upper surface of the first power applying part, and a connecting part connecting the first power applying part and the second power applying part,
wherein the upper surface of the first power applying part of the power applying member and the upper surface of the second power applying part of the power applying member are both perpendicular to the optical axis direction, and
wherein the connecting part of the power applying member extends away from the first power applying part in the optical axis direction.

2. The heating device for a camera module of claim 1, wherein the connecting member comprises an elastic member disposed at a bottom surface facing the upper surface of the first power applying part of the power applying member facing the resistance heating film and closely connecting the power applying member to the resistance heating film.

3. The heating device for a camera module of claim 2, wherein the elastic member comprises a spring comprising any one of a leaf spring and a coil spring.

4. The heating device for a camera module of claim 1, wherein the connecting member is in direct physical contact with the resistance heating film and the power applying member, and
wherein the connecting member is disposed between, in the optical axis direction, the resistance heating film and the power applying member.

5. The heating device for a camera module of claim 1, wherein the first lens comprises an outside surface exposed to outside, and an inner surface disposed opposite the outside surface, and
wherein the resistance heating film is disposed on the inner surface of the first lens.

6. The heating device for a camera module of claim 1, wherein the resistance heating film comprises an ITO (Indium Tin Oxide) film.

7. The heating device for a camera module of claim 1,
wherein the first power applying part comprises a first portion coupled to the connecting part, and a second portion disposed opposite to the first portion, and
wherein the first portion and the second portion of the first power applying part are convex in opposite directions based on the optical axis direction.

8. The heating device for a camera module of claim 1,
wherein the first power applying part comprises a first portion coupled to the connecting part, and a second portion disposed opposite to the first portion,
wherein the first lens comprises a lens part comprising a curved surface, the peripheral part extending outwardly from the lens part, and a boundary part where the lens part and the peripheral part meet, and
wherein the first portion of the first power applying part is bent in a same direction as the curved direction of the portion adjacent to the first portion of the boundary part.

9. The heating device for a camera module of claim 8, wherein the first portion of the first power applying part is spaced apart from the second portion of the first power applying part in a circumferential direction.

10. The heating device for a camera module of claim 1, wherein the power applying member is formed a circular strip shape with an optical axis of the first lens as a center of the circle.

11. The heating device for a camera module of claim 1, wherein the resistance heating film comprises a transparent conductor.

12. The heating device for a camera module of claim 1, wherein the power applying member comprises wirings and a flexible PCB (Printed Circuit Board) comprising flexible insulation members wrapping the wirings and formed with an opening at an area contacting the resistance heating film.

13. The heating device for a camera module of claim 12, wherein the wirings are exposed by the opening and are formed with the terminal part electrically contacting the resistance heating film.

14. The heating device for a camera module of claim 1, wherein the first lens comprises a lens part comprising a curved surface and the peripheral part extending outwardly from the lens part,
wherein the resistance heating film comprises a second portion disposed on the lens part of the first lens, and the first portion extending outwardly from the second portion.

15. A camera module, comprising
a lens barrel;
a lens disposed in the lens barrel;
a PCB (Printed Circuit Board) coupled with the lens barrel;
an image sensor disposed on the PCB; and
the heating device of the claim 1.

16. A heating device for a camera module, comprising;
a resistance heating film disposed on a first lens;
a connecting member disposed on the resistance heating film; and
a power applying member disposed on the connecting member,
wherein the connecting member is disposed on a first portion of the resistance heating film, the first portion of the resistance heating film being disposed on a peripheral part of the first lens, wherein the connecting member comprises an elastic member disposed at a bottom surface facing an upper surface of the power applying member facing the resistance heating film and closely connecting the power applying member to the resistance heating film, wherein the power applying member comprises a terminal part in physical contact with the connecting member, wherein the power applying member comprises a first power applying part disposed on the connecting member and comprising an upper surface facing the connecting member, a second power applying part spaced apart from the first power applying part in an optical axis direction and comprising an upper surface that is parallel to the upper surface of the first power applying part, and a connecting part connecting the first power applying part and the second power applying part, wherein the upper surface of the first power applying part of the power applying member and the upper surface of the second power applying part of the power applying member are both perpendicular to the optical axis direction, and wherein the connecting part of the power applying member extends away from the first power applying part in the optical axis direction.

17. The heating device for a camera module of claim 16, wherein the elastic member comprises a spring comprising any one of a leaf spring and a coil spring.

18. The heating device for a camera module of claim 16, wherein the first power applying part comprises a first portion coupled to the connecting part, and a second portion disposed opposite to the first portion based on the lens part, and wherein the first portion and the second portion of the first power applying part are convex in opposite directions based on the optical axis direction.

19. The heating device for a camera module of claim 16, wherein the power applying member comprises wirings and a flexible PCB (Printed Circuit Board) comprising flexible insulation members wrapping the wirings and formed with an opening at an area contacting the resistance heating film, and wherein the wirings are exposed by the opening and are formed with the terminal part electrically contacting the resistance heating film.

20. A heating device for a camera module, comprising;

a resistance heating film disposed on a first lens;

a connecting member disposed on the resistance heating film; and a power applying member disposed on the connecting member, wherein the connecting member comprises a sheet member having an elasticity, wherein the connecting member is disposed on a first portion of the resistance heating film, the first portion of the resistance heating film being disposed on a peripheral part of the first lens, wherein the power applying member comprises a terminal part in physical contact with the connecting member, wherein the power applying member comprises a first power applying part disposed on the connecting member and comprising an upper surface facing the connecting member, a second power applying part spaced apart from the first power applying part in an optical axis direction and comprising an upper surface that is parallel to the upper surface of the first power applying part, and a connecting part connecting the first power applying part and the second power applying part, wherein the upper surface of the first power applying part of the power applying member and the upper surface of the second power applying part of the power applying member are both perpendicular to the optical axis direction, and wherein the connecting part of the power applying member extends away from the first power applying part in the optical axis direction.

\* \* \* \* \*